R. HENRY.
CUSPIDOR LIFTER.
APPLICATION FILED JULY 14, 1911.
1,026,354.
Patented May 14, 1912.
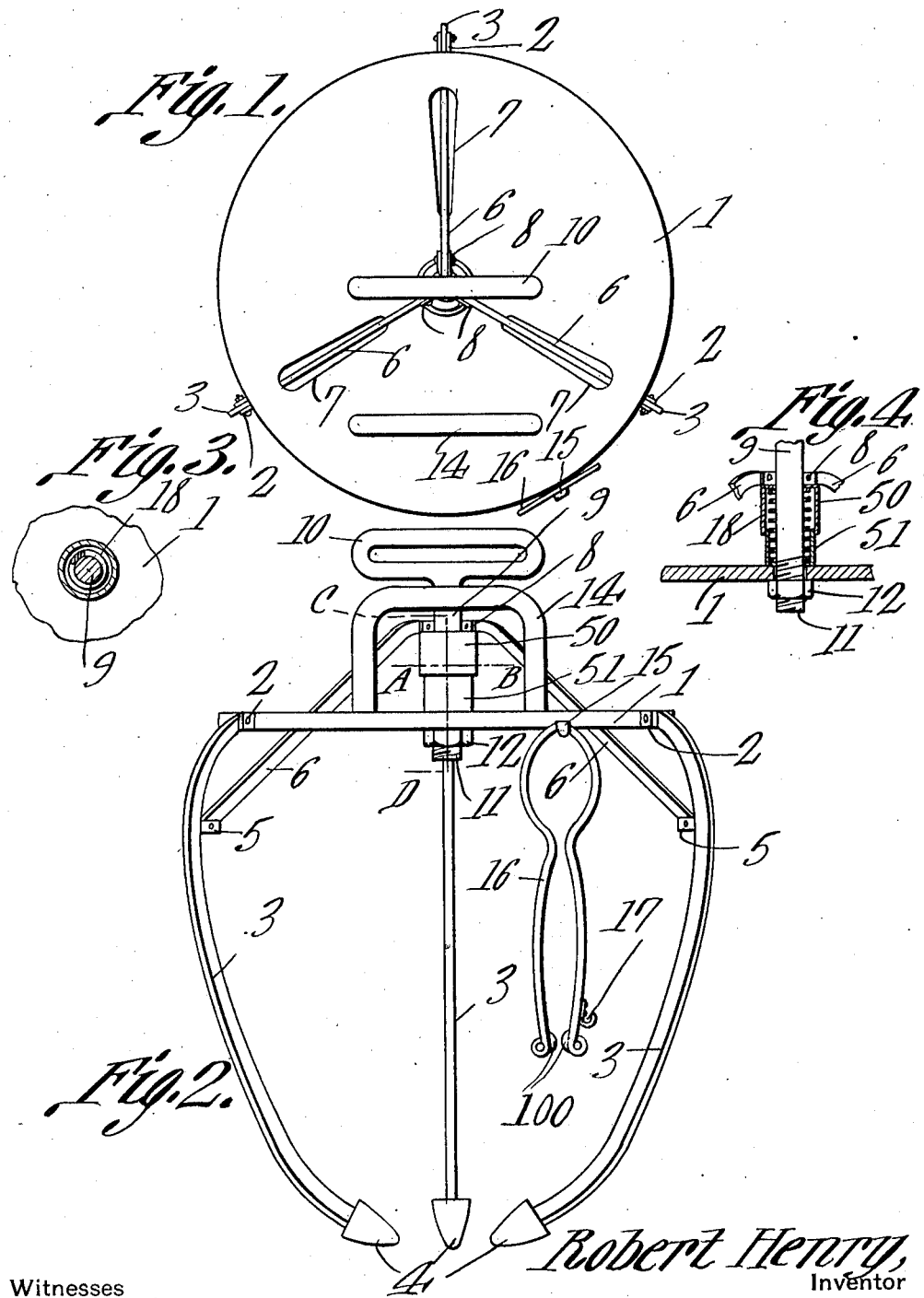
Witnesses
Robert Henry,
Inventor
by C. A. Snow & Co.
Attorneys.

UNITED STATES PATENT OFFICE.

ROBERT HENRY, OF BLUE LAKE, CALIFORNIA.

CUSPIDOR-LIFTER.

1,026,354.　　　　Specification of Letters Patent.　　Patented May 14, 1912.

Application filed July 14, 1911. Serial No. 638,542.

*To all whom it may concern:*

Be it known that I, ROBERT HENRY, a citizen of the United States, residing at Blue Lake, in the county of Humboldt and State of California, have invented a new and useful Cuspidor-Lifter, of which the following is a specification.

The device forming the subject matter of this application, is adapted to be employed for the manipulation of cuspidors, and like noisome receptacles.

The object of the present invention, is to provide novel means for actuating the gripping arms of the device, and to provide novel means for limiting the movement of the said arms.

A further object of the invention is to provide a cuspidor lifter which will comprise few parts, the construction of the device being such that it is not likely to get out of order or require frequent adjustment, or attention.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 shows the invention in top plan; Fig. 2 is a side elevation. Fig. 3 is a section on the line A—B of Fig. 2. Fig. 4 is a section on line C—D of Fig. 2.

In carrying out the invention, there is provided, as a primary and fundamental element, a body, preferably taking the form of a flat plate 1. The body 1 is provided at spaced points about its periphery, with ears 2, between which are pivoted downwardly extended, curvilinear gripping arms 3, adapted to engage the receptacle which is to be manipulated. If desired, the arms 3, adjacent their lower ends, may be provided with resilient elements 4, adapted to engage the receptacle thereby to prevent the receptacle from dropping from the arms, should the grip of the arms upon the receptacle be insufficient otherwise to hold the receptacle.

The arms 3 are provided, below the body 1, with ears 5, between which are pivoted the lower ends of rigid connecting bars 6, the upper ends of which extend through openings 7 in the body 1. The upper extremities of the connecting bars 6 are pivoted between ears 8, formed upon an operating member 9, which is slidable in the body 1. The operating member 9 is equipped, at its upper end, with a suitable handle 10. The lower portion of the operating member 9, which extends through the body 1, is threaded, as shown at 11, and upon the threaded lower end 11 is mounted a nut 12. Fixed to and upstanding from the body 1 is an auxiliary handle 14.

The body 1 is provided, at a suitable point upon its periphery, with a hook 15, upon which may be hung a pair of tongs 16. These tongs 16 may be employed for swabbing out the cuspidor or other receptacle, and one leg of the tongs is provided with an auxiliary hook 17, adapted for the lifting of covers and the like.

Surrounding the operating member 9, is a spring 18, and surrounding the spring is a telescoping casing comprising parts 50 and 51, the part 50 abutting against the ears 8 and the part 51 abutting against the body 1. The spring 18, at its upper end, abuts against the end walls of the part 50, the lower end of the spring abutting against end wall of the part 51.

The operation of the device is as follows: One hand of the operator is placed upon the supplemental handle 14, the other hand of the operator being engaged with the handle 10. The operating member 9 may thus be depressed, bringing the spring 18 under tension. When the operating member 9 is thus depressed, the connecting rods 6 will spread the arms 3 apart, so that the receptacle which is to be lifted may be engaged between the lower, free ends of the arms. When the handle 10 is released, the spring 18 will thrust the operating member 9 upwardly, the connecting rods 6 drawing the arms 3 together, about the periphery of the receptacle. The nut 12 which is mounted upon the lower end 11 of the operating member 9, serves to limit the inward swinging movement of the free ends of the arms 3, under the actuation of the spring 18. Likewise, by manipulating the nut 12 upon the threaded portion 11 of the operating member 9, the tension of the spring 18 may be adjusted and the normal positions of the lower, free ends of the arms 3 may be adjusted likewise.

It is not necessary that the tension of the spring 18 should be relied upon solely, to close the ends of the arms 3 together. For instance, if the handle 14 be thrust downwardly, by one hand of the operator, the handle 10 being pulled upwardly by the other hand of the operator, it will be seen that the lower, free ends of the arms 3, may be engaged about the receptacle independently of the action of the spring 18.

Obviously the telescoping casing 50—51 serves as a housing for the spring 18.

The tongs, adjacent their lower ends, are provided with rubber knobs 100, to facilitate the gripping action of the tongs.

Having thus described the invention, what is claimed is:—

1. A device of the class described comprising a plate; gripping arms pivoted to the periphery of the plate; an operating member movable in the plate; connections extended through openings in the plate, the connections being pivotally united with the arms below the plate, and being pivotally united with the operating member above the plate; a spring thrusting at one end against the plate, and at the other end thrusting against the operating member to effect a closing together of the arms; and adjustable means upon the operating member, below the plate, to engage the plate, and to limit the movement of the arms, under the actuation of the spring.

2. A device of the class described comprising a body; arms pivoted to the periphery of the body; an operating member mounted for sliding movement in the body; connections extended through the openings in the body and united pivotally, at one end, with the arms, the connections being pivotally united at their other ends with the operating member; a spring thrusting against the body and against the operating member, the operating member being threaded, where it passes through the body; and a nut upon the operating member, below the body.

In testimony that I claim the foregoing as my own, I have hereto affixed my signature in the presence of two witnesses.

ROBERT HENRY.

Witnesses:
  JOHN D. GOLDEN,
  ROBERT D. STOCK.

---

Copies of this patent may be obtained for five cents each, by addressing the "Commissioner of Patents, Washington, D. C."